United States Patent
Nay et al.

(10) Patent No.: US 7,513,579 B2
(45) Date of Patent: Apr. 7, 2009

(54) ADJUSTABLE RACK MOUNTABLE COMPUTER TERMINAL MOUNTING SYSTEM

(75) Inventors: David Todd Nay, Raleigh, NC (US); Aaron Roger Cox, Tucson, AZ (US); Daniel Paul Kelaher, Holly Springs, NC (US); Timothy Andreas Meserth, Durham, NC (US); Bradley Michael Lawrence, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 10/822,255

(22) Filed: Apr. 10, 2004

(65) Prior Publication Data

US 2005/0225217 A1    Oct. 13, 2005

(51) Int. Cl.
*A47B 81/06* (2006.01)
(52) U.S. Cl. .............. 312/208.1; 361/680; 361/681; 211/26
(58) Field of Classification Search .......... 312/208.1, 312/265.1, 310, 223.3, 223.2, 271, 273; 108/50.01, 108/50.02; 211/26, 149; 361/679, 680, 681
See application file for complete search history.

(56) References Cited

U.S. PATENT DOCUMENTS

| | | | |
|---|---|---|---|
| 5,388,032 A * | 2/1995 | Gill et al. ............... 700/17 |
| 5,419,525 A | 5/1995 | Hilton ..................... 248/371 |
| 5,487,525 A | 1/1996 | Drabczyk et al. ........... 248/639 |
| 5,549,374 A * | 8/1996 | Krivec .................... 312/257.1 |
| 5,623,881 A | 4/1997 | Huang ..................... 108/50 |
| 5,655,823 A * | 8/1997 | Schairbaum ............... 312/194 |
| 5,761,033 A | 6/1998 | Wilhelm ................... 361/686 |
| 5,839,373 A | 11/1998 | Lin ........................ 108/140 |
| 5,878,674 A * | 3/1999 | Allan ...................... 108/93 |
| 5,913,034 A | 6/1999 | Malcolm .................. 393/200.53 |
| 6,044,758 A | 4/2000 | Drake ...................... 100/43 |
| 6,092,883 A * | 7/2000 | Lechman ................. 312/194 |
| 6,142,590 A | 11/2000 | Harwell .................. 312/223.1 |
| 6,201,690 B1 * | 3/2001 | Moore et al. ............. 361/683 |
| 6,266,236 B1 * | 7/2001 | Ku et al. .................. 361/681 |
| 6,353,532 B1 | 3/2002 | Landrum et al. .......... 361/683 |
| 6,442,030 B1 | 8/2002 | Mammoser et al. ........ 361/727 |
| 6,474,760 B2 * | 11/2002 | Rauls ..................... 312/330.1 |
| 6,481,683 B1 | 11/2002 | Stewart et al. ........... 248/289.11 |
| 6,563,700 B1 | 5/2003 | Walter et al. ............. 361/683 |

* cited by examiner

*Primary Examiner*—James O Hansen
(74) *Attorney, Agent, or Firm*—Kunzler & McKenzie

(57) ABSTRACT

An end user work space mounting system for use with a computer cabinet. The end user work space may include a computer terminal or shelf, drawer or platform. The height of the workspace is adjustable in the vertical direction. In the case of a computer terminal, the viewing angle of the monitor, i.e., with respect to rack and the keyboard, is also adjustable. The keyboard, monitor, and bracket fold into the same plane, so that the keyboard, monitor, and bracket can fold into the rack when not in use.

6 Claims, 4 Drawing Sheets

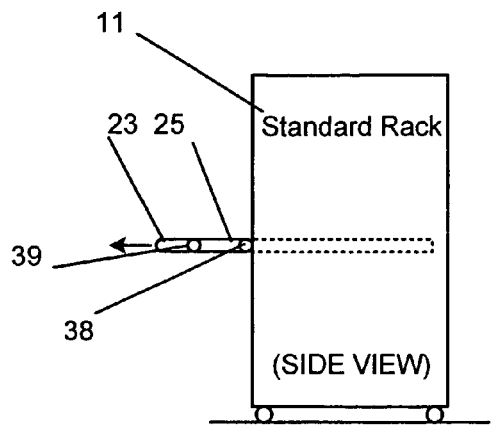
FIG 5A
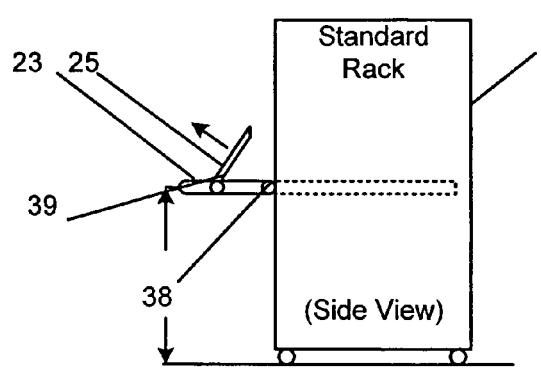
FIG 5B
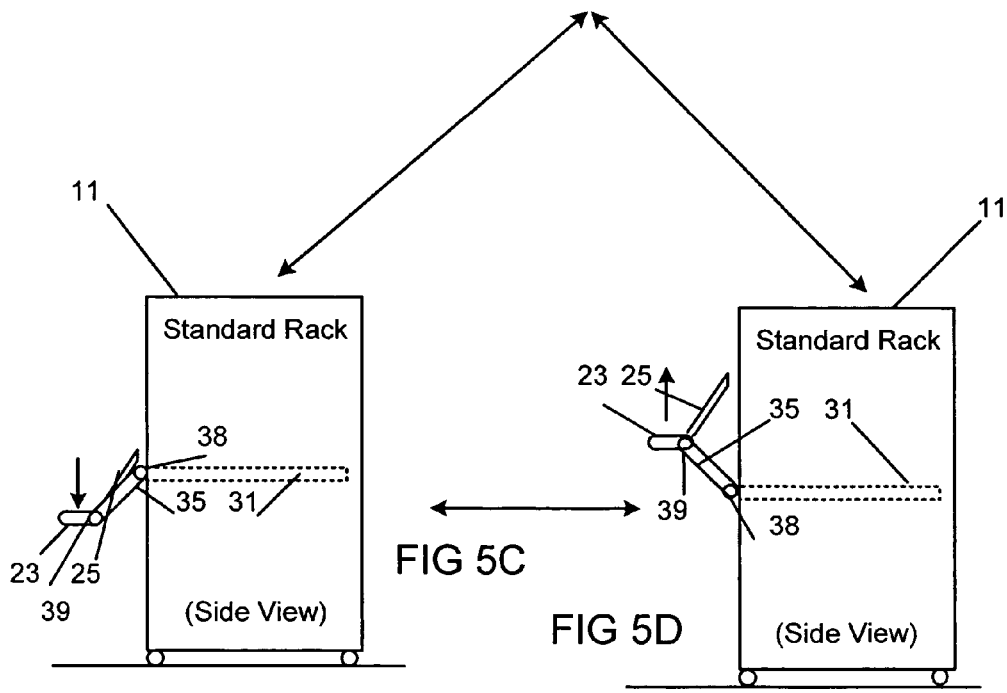
FIG 5C
FIG 5D

ADJUSTABLE RACK MOUNTABLE COMPUTER TERMINAL MOUNTING SYSTEM

BACKGROUND

1. Technical Field

The present invention relates in general to hardware for computer systems, and, in particular, to a user workspace mounting system for a computer terminal including a keyboard and flat screen monitor for a server rack.

2. Description of Related Art

Rack mounted keyboard-display units are used in computer installations characterized by rack mounted computers in banks and bays of computer cabinets, such as server farms, routers, and database management intensive computer complexes (financial institutions, insurance companies, stock and commodity dealers and exchanges, and the like). Typical rack mounted keyboard-display units are horizontally adjustable, that is, they are slidable into and out of the cabinet into an aisle, being mounted in or on a sliding drawer or on brackets and fixed rails.

While this provides for horizontal adjustability, that is adjustability into and out of the cabinet, it does not provide for vertical adjustability, that is, up-and-down adjustability. This presents, at best, a user convenience problem, and at worst an ergonomics and worker safety problem, especially in a workplace or workgroup where there are users of varying heights.

Thus, a need exists for an end user vertically adjustable rack mounted end user work space, such as a shelf, platform, drawer, or computer terminal including a keyboard-display unit, allowing easy access by a wide range of users.

SUMMARY

The system and apparatus described herein provides both horizontal and vertical adjustability, that is adjustability into and out of the cabinet, and up-and-down adjustability. This obviates the user convenience and ergonomics problems of the prior art, and allows for adjustment of the height of the terminal in a workplace or workgroup where there are users of varying heights. The result is a vertically adjustable rack mounted keyboard-display unit allowing easy access by a wide range of users.

An embodiment of the system of our invention provides a computer terminal, including a keyboard display unit, adapted for rack mounting, where the height of keyboard is easily adjustable in the vertical direction, that is, easily adjustable in height relative to the rack, to accommodate worker characteristics. This is accomplished by pivotally mounting the keyboard and display on a bracket, that is a bracket including a pair of frames, where a first frame including its parallel frame elements, is horizontally slidable, and the second frame, including its parallel frame elements, is pivotally mounted on, and vertically adjustable with respect to the first frame. When the end user work space is a computer terminal, the viewing angle of monitor is adjustable with respect to the frame and the keyboard, and the keyboard, monitor, and first and second frames fold into the same plane so that the keyboard, monitor, and bracket and are slidably storable within the cabinet when not in use.

Preferably the display is a flat panel display such as a liquid crystal display, an LCD array display, or a plasma display.

As shown in FIG. 1 the bracket has two frames pivoted at a pivot point therebetween. Each frame is generally rectangular and formed of four frame elements. The first frame contains two longitudinal elements and two lateral elements, arrayed to be horizontally slidable into and out of the cabinet but not vertically adjustable. The second frame is similarly a rectangular array of four frame elements, and joined at a pivot means at its proximal edge or segment to a distal edge or segment of the first frame of the bracket. The second frame contains two elements, one on each side of the keyboard and display, or other workspace. The second frame is mounted at a pivot means to the first frame and is pivotable with respect to the first frame such that its distal edge is capable of vertical movement while its proximal edge (attached to the first frame of the bracket) is vertically fixed. The keyboard and display are pivotally mounted at the vertically movable distal region or edge of the second frame of the bracket for angular and vertical adjustment.

The first frame of the bracket is inwardly and outwardly slidable with respect to the cabinet, so that a distal edge region of the first frame of the bracket is extendable outwardly of the cabinet, but is fixed in height, that is, vertically fixed, with respect to the rack, and the cabinet.

The second frame of the bracket is pivotally mounted at its proximal edge region edge to the distal edge region of the first frame of the bracket. The pivotable mounting allows vertical movement of the distal end of the second frame of the bracket, the user work space, as a shelf, platform, or keyboard and the display.

The end user work space, such as, the keyboard and display are pivotally mounted to the second frame of the bracket at the distal region thereof for angular adjustment of the keyboard and display, for example, during the vertical adjustment of the distal region of the second frame of the bracket.

It is to be understood that while the invention is described with respect to a computer keyboard and display, the frames, bracket and pivot means described herein may provide a shelf, such as a horizontal shelf, for example, for a computer, items temporarily placed on a shelf as documents, paperwork, and hardcopy files, memo pads, books, and the like.

In operation the user pulls out the terminal or shelf, causing the horizontally slidable frame of the bracket to extend outward so that its pivot points with the vertically adjustable frame are at or beyond the edge of the rack, to allow pivoting of the pivotable, vertically adjustable second frame of the bracket.

BRIEF DESCRIPTION OF THE DRAWINGS

FIG. 5 includes FIG. 5A, FIG. 5B, FIG. 5C, AND FIG. 5D, illustrating the computer cabinet with the rack mounted terminal in a sequence of positions.

DETAILED DESCRIPTION

The nature, objectives, and advantages of the invention will become more apparent to those skilled in the art after considering the following detailed description in connection with the accompanying drawings.

The system and structure of our invention provides a support or shelf, for example, for an end user work space, such as a platform, shelf, or drawer, or for a computer terminal including a keyboard-display unit adapted for rack mounting, where the height of support or shelf is adjustable in the vertical direction, that is, adjustable in height to accommodate worker characteristics. The viewing angle of monitor is adjustable with respect to the, computer cabinet and rack and to the keyboard, and the keyboard, monitor, and bracket fold into the same plane so that the keyboard, monitor, and bracket are slidably storable in the rack and cabinet when not in use.

Preferably the display is a flat panel display such as a liquid crystal display, an LCD array display, or a plasma display. This is to facilitate compact and slidable storage of the keyboard and display in a rack of the computer cabinet.

In operation the user pulls out the platform, shelf, drawer, or computer terminal, causing the horizontally slidable, inboard, first frame of the bracket to extend outward so that its pivot points, that is, pivot means, with the vertically adjustable, outboard, second frame are at or beyond the edge of the rack. This allows pivoting of the pivotable, vertically adjustable, outboard, second frame of the bracket, providing vertical adjustment of the end user workspace, that is, the shelf or computer terminal. The end user workspace, that is the shelf or computer terminal, including the keyboard and display, are pivotally adjustable at the outboard end of the outboard frame of the bracket, to allow for proper working, viewing and keyboarding angles.

In the case of an adjustable computer terminal, the entire terminal, that is, the keyboard and the display, may be independently pivotable about pivot points. Alternatively, the keyboard and the display may be jointly pivotable as a single unit.

Figure 1:
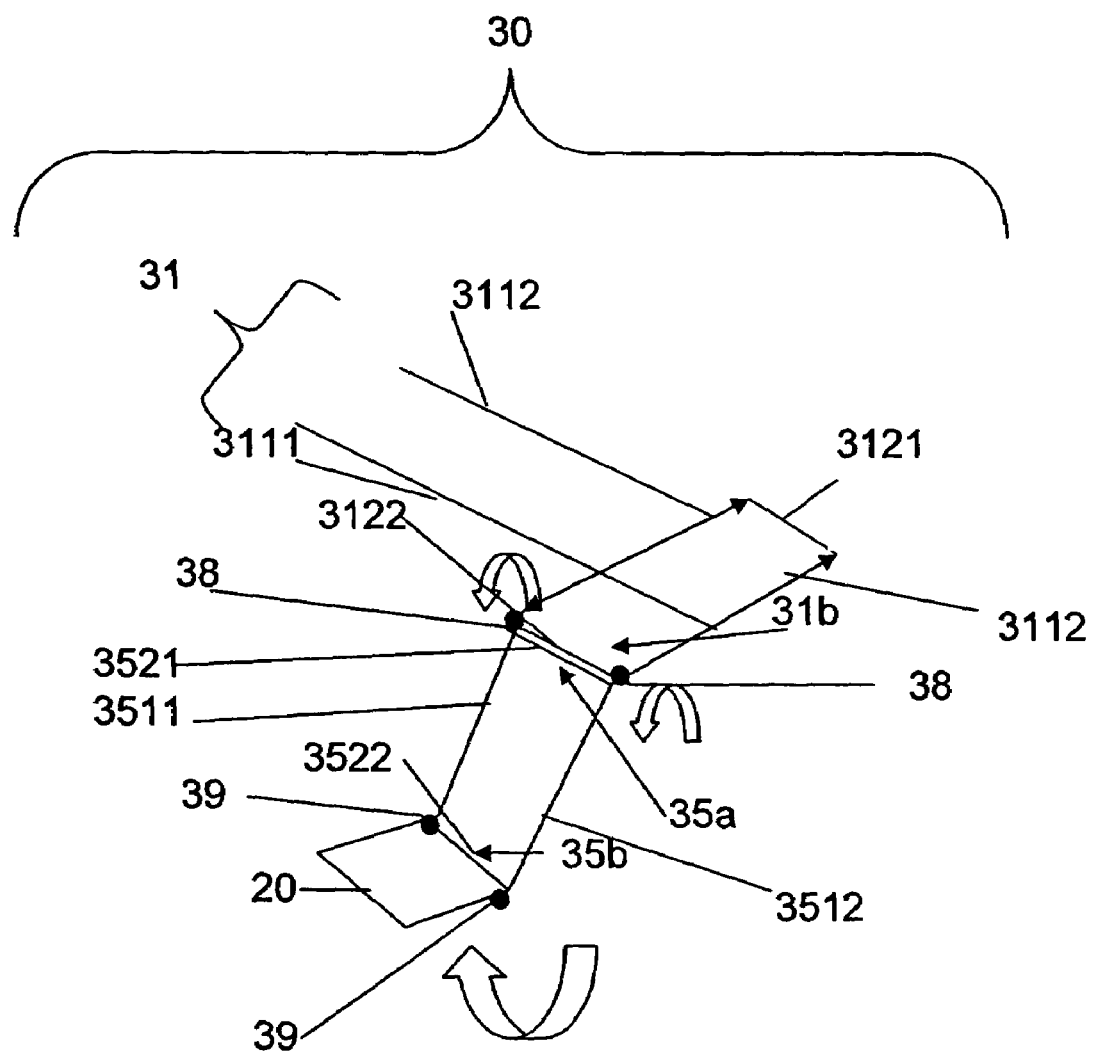
FIG. 1 shows a bracket for use in a rack mounted computer cabinet.

FIG. 1 shows a rack mountable user workspace mounting system comprising a bracket 30 with an end user workspace 20 (illustrated as a computer terminal 21 including a vertically adjustable and pivotable keyboard holder and keyboard unit 23, also referred to as just a keyboard, and a display unit holder and display unit 25, also referred to as just a display, in FIGS. 3, 4, and 5A, 5B, 5C, and 5D). The keyboard and or display units may also be combined with a computer system, such as with laptop computers, or computer tablets where a screen interface allows for user input to be provided by contacting the display screen, The bracket 30 has a first frame 31 extending out of the cabinet 11 and pivotally mounted to a second frame 35 at a pivot 38, with the end user workspace 20 at a second pivot means 39 at the opposite end of the second frame 35 of the bracket, 30. The frames, 31 and 35 are each rectangular, with longitudinal frames, 3111, 3112, 3511, and 3512, and lateral frames, 3121, 3122, 3521, and 3522.

Figure 2:
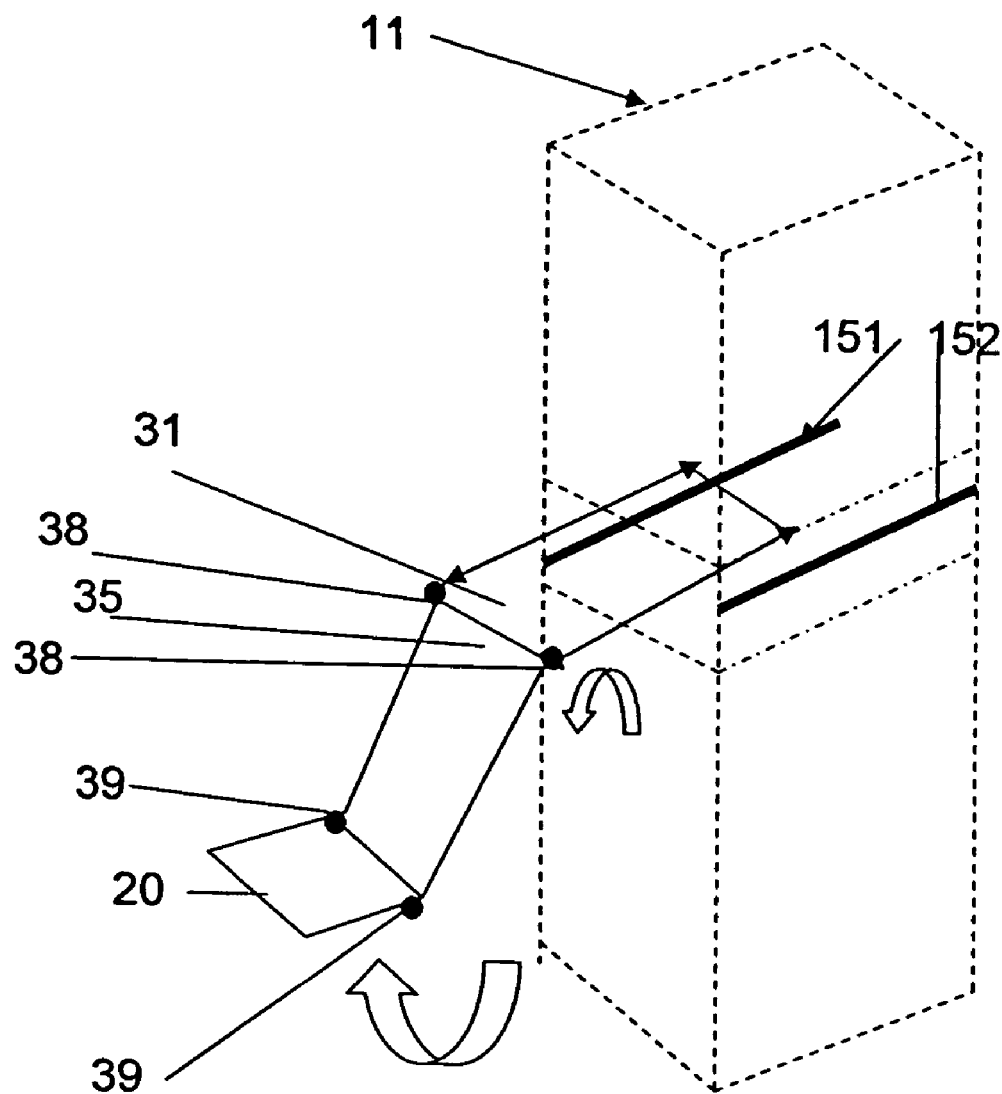
FIG. 2 shows a user at a cabinet using a rack mounted terminal, including a vertically adjustable keyboard and display unit.

FIG. 2 shows a cabinet 11, in phantom view, with a user workspace 20 (illustrated as a computer terminal 21 including a vertically adjustable and pivotable keyboard 23 and display unit 25 in FIGS. 3, 4, and 5A, 5B, 5C, and 5D) with a bracket 30 having a first frame 31 extending out of the cabinet 11 and pivotally mounted to a second frame 35, with the keyboard 23 and display 25 at the opposite end of the second frame 35 of the bracket, 30.

As shown in FIGS. 1 and 2, the bracket 30 has two frames; 31 and 35, a first frame 31 that is horizontally slidable into and out of the cabinet 11 and a second frame 35 that joined at its proximal edge or segment 35a to a distal edge or segment 31b of the first frame 31 of the bracket 30. The second frame 35 of the bracket 30 is pivotable, e.g., at a pivot point 38 with respect to the first frame 31 of the bracket 30 to facilitate vertical adjustment of the work space 20, such as a keyboard and display. The user workspace 20 is pivotally mounted at a distal region or edge 35b of the second frame 35 of the bracket 30 for angular adjustment as the second frame 35 is vertically adjusted. This maintains the user workspace 20 in horizontal alignment and substantially perpendicular to the cabinet 11.

The first frame 31 of the bracket 30 is inwardly and outwardly slidable with respect to the rack 13 and the cabinet 11 so that a distal edge region 31b of the first frame 31 of the bracket 30 is extendable outwardly of the cabinet 11 but is fixed in height, that is, vertically fixed, with respect to the cabinet 11.

The first frame 31 of the bracket 30 is movable with respect to the cabinet 11. The movability of the first frame 31 is along rails 151 and 152 within the cabinet 11. Movability may be obtained by rolling with bearings or wheels, or by enhanced slidability, for example with rails 151 and 152 or frames 3111 and 3112 or both fabricated of lubricious materials. As used herein "lubricious materials" are materials having a coefficient of sliding friction measured against steel below about 0.11. Exemplary of such lubricious materials are polytetrafluroethylene, high density polyethylene, polyphenylene ether, polypropylene, polystyrene, and polymethylmethacrylate.

The second frame 35 of the bracket 30 is pivotally mounted at its proximal edge region 35a to the distal edge region 31b of the first frame 31 of the bracket 30. The pivotable mounting allows vertical movement of the user workspace 20, as the platform, shelf, drawer, or computer terminal 21 including a keyboard 23 and display 25, as shown in FIGS. 3, 4, and 5A, 5B, 5C, and 5D.

The keyboard 23 and display 25 of the computer terminal 21 are pivotally mounted to the second, pivotable, or rotatable frame 35 of the bracket 30 at the distal region 35b thereof for angular adjustment of the keyboard 23 and display 25.

The pivot points 39 provide flexibility for rotation while providing a degree of rigidity. This is a matter of routine engineering choice, and can be provided by friction brakes, pressure detents, thumb action detents, springs, opposed springs, weights, opposed weights, counter weights, and various known fulcrum arrangements and lever arrangements.

Figure 3:
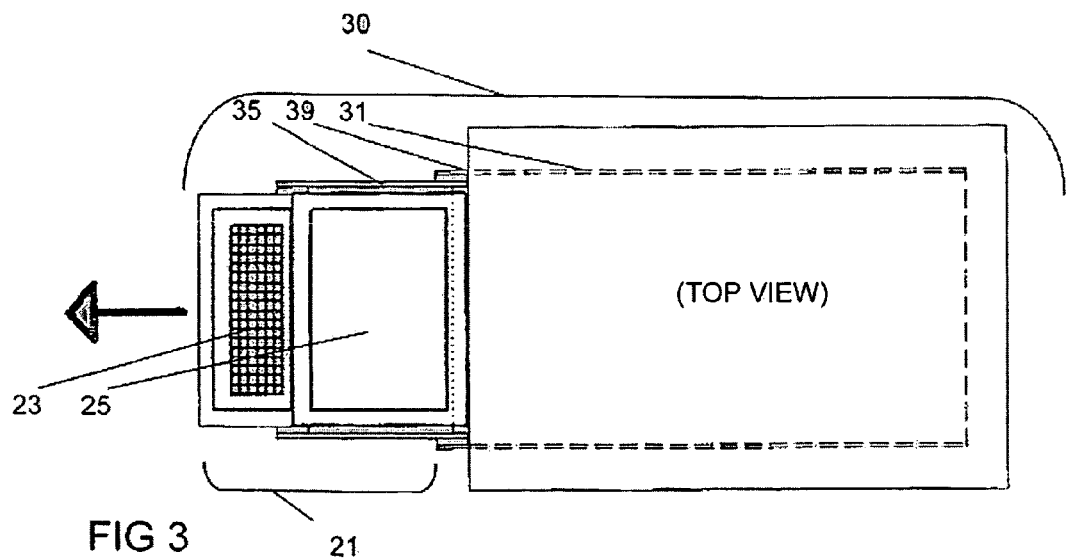
FIG. 3 shows a top view of the computer cabinet with a rack mounted terminal, including a vertically adjustable keyboard and display unit, and with a bracket.

FIG. 3 shows a top view of the computer cabinet 11 of FIG. 2 with a rack mounted terminal 21 including a vertically adjustable keyboard 23 and display unit 25 and with a bracket 30. The bracket 30 has a first frame 31 extending out of the cabinet 11 and pivotally mounted to a second frame 35 thereof, and the keyboard 23 and display 25 at the opposite end of the second frame 35 of the bracket 30.

Figure 4:
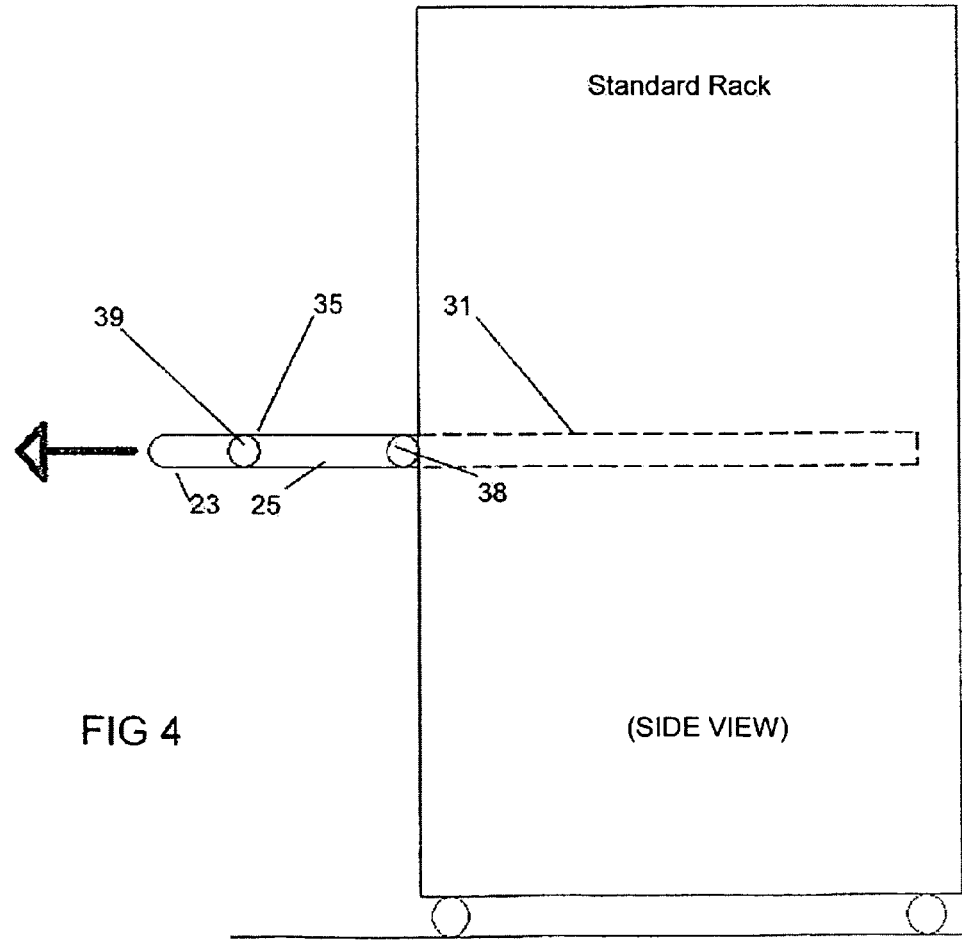
FIG. 4 shows a side elevation of the computer cabinet of FIG. 3.

FIG. 4 shows a side elevation of the computer cabinet 11 of FIGS. 2 and 3 with a rack mounted terminal 21 including a vertically adjustable keyboard 23 and display unit 25 and with a bracket 30. The bracket has a first frame 31 extending out of the cabinet 11 and pivotally mounted to a second frame 35 with the keyboard 23 and display 25 at the opposite end of the second frame 35 of the bracket 30.

FIG. 5 includes FIGS. 5A, 5B, 5C, and 5D. FIG. 5A illustrates the computer cabinet 11 with the rack mounted terminal 21 still in a planar or storage configuration, being withdrawn from the computer cabinet 11 on the horizontally slidable bracket 30. FIG. 5B shows the display 31 angularly rotated or pivoted for viewing and use. FIGS. 5C and 5D show the second frame 35 (pivotable frame) of the bracket 30 alternatively rotated downward to lower the keyboard 23 and display 25 in FIG. 5C and rotated upward to raise the keyboard 23 and display 25 in FIG. 5D.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

We claim:

1. A computer terminal bracket rack mounted in a computer cabinet and configured to fold into a single horizontal plane, comprising:
    a first frame movable with respect to the computer cabinet by wheels over rails, the rails fabricated of a lubricious material with a coefficient of sliding friction of less than 0.11, whereby a distal edge of the first frame of the bracket is extendable outwardly from the computer cabinet; and
    a second frame composed of two longitudinal frames horizontally separated by two lateral frames, the longitudinal frames and lateral frames forming a horizontally disposed open rectangle with a first lateral frame connecting only to a proximal end of each longitudinal frame, a second lateral frame connecting only to a distal end of each longitudinal frame, and the first and second lateral frames not impinging on an open interior of the rectangle, wherein each longitudinal frame's longitudinal dimension is much greater than the longitudinal frame's latitudinal dimension, pivotally mounted by first friction hinges at a proximal edge to the distal edge of the first frame, the first friction hinges configured for the second frame to rotate about the distal edge of the first frame and comprising first friction brakes that restrain rotation at a desired angle;
    a keyboard holder pivotally mounted to the second frame by second friction hinges at a distal edge thereof for angular adjustment of the keyboard holder, the second friction hinges configured for the keyboard holder to rotate about the distal edge of the second frame and comprising second friction brakes that restrain rotation at a desired angle, wherein the height of said keyboard holder is adjustable in a vertical direction;
    a keyboard coupled to said keyboard holder;
    a display holder pivotally mounted to the second frame at the distal edge thereof for angular adjustment of the display holder; and
    a display coupled to said display holder.

2. The computer terminal bracket of claim 1 wherein the keyboard holder and display holder comprise a single terminal unit pivotable about the distal edge of the second frame.

3. The computer terminal bracket of claim 1 wherein the keyboard holder and display holder are individually pivotable about the distal edge of the second frame of the bracket.

4. A rack storage bracket mounted in a cabinet, said bracket being adjustably movable outward from the cabinet and configured to fold into a single horizontal plane, said bracket comprising:
    a first frame movable horizontally with respect to the cabinet by wheels over rails, the rails fabricated of a lubricious material with a coefficient of sliding friction measured against steel of less than 0.11, whereby a distal edge of the first frame of the bracket is extendable outwardly from the computer cabinet; and
    a second frame composed of two longitudinal frames horizontally separated by two lateral frames, the longitudinal frames and lateral frames forming a horizontally disposed open rectangle with a first lateral frame connecting only to a proximal end of each longitudinal frame, a second lateral frame connecting only to a distal end of each longitudinal frame, and the first and second lateral frames not impinging on an open interior of the rectangle, wherein each longitudinal frame's longitudinal dimension is much greater than the longitudinal frame's latitudinal dimension, pivotably joined to the first frame with first friction hinges at the distal edge of the first frame, the first friction hinges configured for the second frame to rotate about the distal edge of the first frame and comprising first friction brakes that restrain rotation at a desired angle;
    a single terminal unit pivotally mounted to the second frame by second friction hinges at a distal edge thereof for angular adjustment of said single terminal unit, the second friction hinges configured for said single terminal unit to rotate about the distal edge of said second frame and comprising second friction brakes that restrain rotation at a desired angle, wherein the height of said single terminal unit is adjustable in a vertical direction;
    a keyboard coupled to said single terminal unit; and
    a display coupled to said single terminal unit.

5. A cabinet for a rack mounted computer system, said cabinet comprising a bracket for storage in the cabinet, said bracket being adjustably movable outward from the cabinet, wherein said bracket folds into a single horizontal plane said bracket comprising:
    a first frame vertically fixed and horizontally movable with respect to the cabinet by wheels over rails, the rails fabricated of a lubricious material with a coefficient of sliding friction measured against steel of less than 0.11, whereby a distal edge of the first frame of the bracket is extendable outwardly from the cabinet; and
    a second frame composed of two longitudinal frames horizontally separated by two lateral frames, the longitudinal frames and lateral frames forming a horizontally disposed open rectangle with a first lateral frame connecting only to a proximal end of each longitudinal frame, a second lateral frame connecting only to a distal end of each longitudinal frame, and the first and second lateral frames not impinging on an open interior of the rectangle, wherein each longitudinal frame's longitudinal dimension is much greater than the longitudinal frame's latitudinal dimension, pivotably joined to the first frame with first friction hinges at the distal edge of the first frame, the first friction hinges configured for the second frame to rotate about the distal edge of the first frame and comprising first friction brakes that restrain rotation at a desired angle;
    a keyboard holder pivotally mounted to the second frame by second friction hinges at a distal edge thereof for angular adjustment of the keyboard holder, the second friction hinges configured for the keyboard holder to rotate about the distal edge of the second frame and comprising second friction brakes that restrain rotation at a desired angle, wherein the height of said keyboard holder is adjustable in a vertical direction;
    a keyboard coupled to said keyboard holder;
    a display holder pivotally mounted to the second frame at the distal edge thereof for angular adjustment of the keyboard holder and display holder, wherein an angle of said display holder is adjustable with respect to the cabinet and the keyboard holder; and
    a display coupled to said display holder.

6. The cabinet of claim 5 wherein said lubricious material is chosen from the group consisting of polytetrafluroethylene, high density polyethylene, polyphenylene ether, polypropylene, polystyrene, and polymethylmethacrylate.

* * * * *